(12) United States Patent
Tanaka

(10) Patent No.: US 9,367,282 B2
(45) Date of Patent: Jun. 14, 2016

(54) ELECTRONIC MUSIC BOX

(71) Applicant: Masahide Tanaka, Osaka (JP)

(72) Inventor: Masahide Tanaka, Osaka (JP)

(73) Assignee: NL GIKEN INCORPORATED, Osaka (JP)

( * ) Notice: Subject to any disclaimer, the term of this patent is extended or adjusted under 35 U.S.C. 154(b) by 11 days.

(21) Appl. No.: 14/318,646

(22) Filed: Jun. 29, 2014

(65) Prior Publication Data

US 2014/0316544 A1 Oct. 23, 2014

Related U.S. Application Data

(63) Continuation of application No. 13/088,362, filed on Apr. 17, 2011, now Pat. No. 8,805,559.

(30) Foreign Application Priority Data

Apr. 17, 2010 (JP) ................... 2010-095553

(51) Int. Cl.
  *G10H 1/36* (2006.01)
  *G06F 3/16* (2006.01)
  *G10H 1/42* (2006.01)
  *G10H 1/00* (2006.01)

(52) U.S. Cl.
  CPC .................. G06F 3/165 (2013.01); G10H 1/42 (2013.01); *G10H 1/0025* (2013.01); *G10H 2210/356* (2013.01); *G10H 2250/211* (2013.01)

(58) Field of Classification Search
  CPC .................. G10H 2210/066; G10H 2210/076; G10H 1/0025; G10H 7/008; G10H 1/02; G10H 2210/071; G10H 2240/131; G10H 2250/211; G10H 2210/111; G10H 2210/115; G10H 2210/341; G10H 2210/381; G10H 2210/331; G10H 2210/356; G10H 2210/371; G10H 2240/135
  See application file for complete search history.

(56) References Cited

U.S. PATENT DOCUMENTS

| | | | | |
|---|---|---|---|---|
| 5,208,415 A * | 5/1993 | Sato | .......................... | G10H 1/04 84/629 |
| 5,832,431 A * | 11/1998 | Severson | ................. | A63H 5/00 704/258 |
| 5,973,250 A * | 10/1999 | Zirille | ...................... | G10H 1/26 84/600 |
| 8,805,559 B2 * | 8/2014 | Tanaka | ..................... | G10H 1/42 700/94 |
| 2005/0217463 A1 * | 10/2005 | Kobayashi | ............... | G10H 1/40 84/612 |
| 2007/0084332 A1 * | 4/2007 | Blaszczyk | ................ | A63H 5/00 84/600 |
| 2008/0040123 A1 * | 2/2008 | Shishido | .............. | G10H 1/0008 704/503 |
| 2011/0088534 A1 * | 4/2011 | Takashima | ............. | G10H 1/366 84/622 |
| 2011/0257773 A1 * | 10/2011 | Tanaka | ..................... | G10H 1/42 700/94 |
| 2013/0305903 A1 * | 11/2013 | Fong | ........................ | G10H 1/26 84/609 |
| 2014/0308873 A1 * | 10/2014 | Spacek | ................ | A63H 33/006 446/175 |

* cited by examiner

*Primary Examiner* — Marlon Fletcher

(57) ABSTRACT

Music data memory includes pieces of music within a group and other pieces of music outside the group. The next piece to be played is automatically determined by random table among pieces within the group. Favorite or newest piece is weighted to be more frequently played in the group. Piece in music data memory is automatically included into the group by random table. Newly downloaded piece into music data memory is included into the group by priority. Most frequently played piece is excluded from the group in place of newly included piece. Favorite or newest piece may be an exception of exclusion. Next piece is capable of being played in tempo similar to that of preceding piece by means of tempo-adjusted or piece replacement or repetition of the same piece for the purpose of continued baby cradling in synchronism with the same tempo of succeeding pieces.

20 Claims, 7 Drawing Sheets

ELECTRONIC MUSIC BOX

CROSS REFERENCE TO RELATED APPLICATION

This application is a Continuation Application of U.S. application Ser. No. 13/088,362 filed Apr. 17, 2011, herein incorporated by reference in its entirety.

BACKGROUND OF THE INVENTION

1. Field of the Invention

This invention relates to an electronic music box.

2. Description of the Related Art

In this field of the art, various attempts have been done with respect to an electronic music box.

For example, Japanese Publication No. 2003-311034 proposes a baby bedside mobile combined with an electronic music box. On the other hand, Japanese Publication No. 1996-328555 proposes a music play controlling apparatus in which 1/f fluctuation is introduced into electronically generated sound. Further, Japanese Publication No. 1993-73052 proposes a music sound modulating apparatus in which a fluctuation of band and amplitude suitable for string instrument and a fluctuation of band and amplitude suitable for wind instrument are introduced, respectively, for avoiding an unnatural musical sound which would be otherwise caused by introducing a fluctuation of the same band and same amplitude into both string instrument sound and wind instrument sound both electrically generated.

However, there still exist in this field of art many demands for improvements of electronic music boxes.

SUMMARY OF THE INVENTION

Preferred embodiment of this invention provides an electronic music box comfortable to listen to.

Preferred embodiment of this invention provides an electronic music box suitable to be incorporated into a baby bedside mobile or the like.

Preferred embodiment of this invention provides an electronic music box comprising a music data memory arranged to store data of a plurality of pieces of music, a random table memory arranged to store a random table, and a controller arranged to automatically determine the next piece of music to be played in accordance with the random table in the random table memory. According to the feature of the embodiment, painful circulation of a limited number of short pieces of music in the patterned and remembered same order is eased.

In a detailed design according to the above preferred embodiment, the music data memory includes pieces of music within a group and other pieces of music outside the group. And, the controller is arranged to automatically determine the next piece of music to be played among the pieces of music within the group.

According to a more detailed design of the above preferred embodiment, the controller is arranged to automatically determine a piece for inclusion into the group in accordance with the random table in the random table memory. This is advantageous to avoid a patterned or remembered substitution of piece.

According to another more detailed design of the above preferred embodiment, the controller is arranged to automatically determine a piece for exclusion from the group in accordance with the number of played times of the piece. This is advantageous to automatically remove a too frequently played piece out of the group for avoiding a boring repetition of the same piece.

According to another detailed design of the above preferred embodiment, the controller is arranged to weight a predetermined piece in determining the next piece of music to be played, whereby the weighted piece has a chance of more frequently played than the others. This is advantageous to playing a favorite piece within the group.

According to still another detailed design of the above preferred embodiment, the controller is arranged to have a capability of playing the next piece with a tempo similar to that of a preceding piece. This is especially advantageous in the case that the electronic music box is used for cradling a baby. In more detail, such a condition that the series of pieces are played in the similar tempo for a considerably sufficient time period according to the above feature is more suitable in a case that a mother is sending a baby to sleep in her arms with the baby cradled in synchronism with the music box pieces, rather than a condition that the tempo or meter changed piece by piece in every short period as in an ordinary music box.

Preferred embodiment of this invention also provides an electronic music box comprising a music data memory arranged to store data of a plurality of pieces of music, the stored pieces of music including pieces of music within a group and other pieces of music outside the group, and a controller arranged to automatically determine the next piece of music to be played among the pieces of music within the group. This feature is both advantageous in getting familiar with the limited number of pieces in the group and in avoiding an excessive monotony by means of making a substitution of pieces in the group possible.

In a detailed design according to the above preferred embodiment, the controller is arranged to automatically determine the piece to be excluded from the group in accordance with the number of played times of the piece. This is advantageous to automatically remove a too frequently played piece out of the group for avoiding a boring repetition of the same piece.

According to another detailed design of the above preferred embodiment, the controller is arranged to weight a predetermined piece among the pieces within the group in determining a piece to be excluded from the group, whereby the weighted piece has a less chance of being excluded than the others. This is advantageous to keep a favorite or newly included piece in the group in longer time than the other pieces.

According to still another detailed design of the above preferred embodiment, the controller is arranged to weight a predetermined piece among the pieces outside the group in determining a piece to be included into the group, whereby the weighted piece has a priority of being included to the others. This is advantageous to include a piece newly downloaded from an outside server into the group prior to the other pieces outside the group, for example.

According to a further detailed design of the above preferred embodiment, the controller is arranged to automatically determine the piece to be excluded from the group with discrimination between pieces. An example of the discrimination is by the number of played times of the piece. This is advantageous to remove a too frequently played piece out of the group in higher priority for avoiding a boring repetition of the same piece.

Another example of the discrimination is an exception to a predetermined piece not to be determined for exclusion. This is advantageous to prevent a favorite piece from being excluded from the group, for example.

Still another example of the discrimination is between a piece newly included into the group and other older pieces in the group. This is advantageous to exclude other older pieces from the group prior to excluding the newly included piece in the group.

According to still another detailed design of the above preferred embodiment, the electronic music box further comprises a communicator arranged to receive data of a piece of music from outside server for storage in the music data memory, wherein the controller is arranged to automatically determine a piece to be included into the group so that a piece received by the communicator to be newly stored in the music data memory is given priority to other older pieces stored in the music data memory. Thus, the newly received piece will have an earlier chance to be played.

According to further detailed design of the above preferred embodiment, the controller is arranged to excluded from the group a piece of a tempo different from those of other pieces in the group and to include into the group a piece of a tempo similar to those of other pieces in the group in place of the excluded piece. Thus, the controller can successively play pieces in the group with a similar tempo. This is advantageous for a mother who is sending a baby to sleep in her arms to cradle the baby in synchronism with the music box pieces for a considerably long time.

Preferred embodiment of this invention further provides an electronic music box comprising a music data memory arranged to store data of a plurality of pieces of music, and a controller arranged to automatically determine the next piece of music to be played, the controller being arranged to have a capability of playing the next piece with a tempo similar to that of a preceding piece.

For example, the controller is arranged to adopt a piece of a tempo similar to that of the preceding piece to serve as the next piece in place of a piece of a tempo different from that of the preceding piece. Thus, the controller is capable of playing the next piece with a tempo similar to that of a preceding piece.

In another example, the controller is arranged to modify the tempo of the next piece into a tempo similar to that of the preceding piece. In this manner, the controller is also capable of playing the next piece with a tempo similar to that of a preceding piece.

In accordance with a still another example, the controller is arranged to have a first mode of sequentially playing the plurality of different piece one by one and a second mode of repeating the preceding piece as the next piece. In the second mode above, the controller is also capable of playing the next piece with a tempo similar to that of a preceding piece in one of the most simplified manner.

Preferred embodiment of this invention still further provides an electronic music box comprising a sequencer, a sound source controlled by the sequencer and music box signal output capable of converting the output from the sound source into sound signal for powering a speaker by way of an amplifier. The electronic music box further comprises a modifying function unit for introducing 1/f fluctuation into the music at one or more of various stages of the music box, such as basic sequencer output, expression modifying data to cause ritardando or tempo rubato, sound attenuating data for chime sound or the like, and volume of final sound signal.

Other features, elements, arrangements, steps, characteristics and advantages according to this invention will be readily understood from the detailed description of the preferred embodiment in conjunction with the accompanying drawings.

The above description should not be deemed to limit the scope of this invention, which should be properly determined on the basis of the attached claims.

DETAILED DESCRIPTION OF THE PREFERRED EMBODIMENTS

Figure 1:
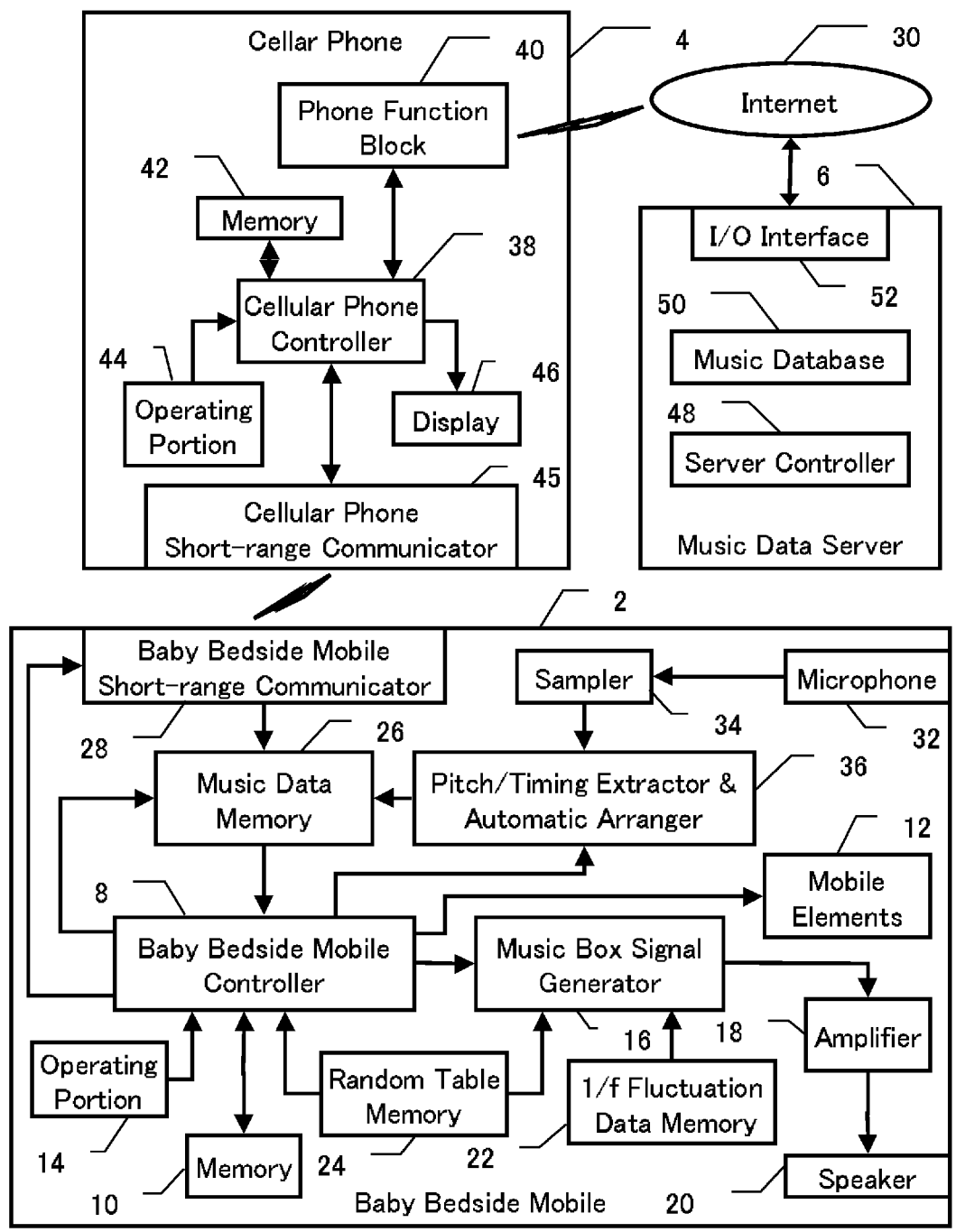
FIG. 1 is a block diagram showing the electronic music box system according to an embodiment of this invention.

FIG. 1 is a block diagram showing the electronic music box system according to an embodiment of this invention. The system includes baby bedside mobile 2 with electronic music box function, cellular phone 4 and music data server 6. Baby bedside mobile 2 is controlled by baby bedside mobile controller 8 having a micro computer. Memory 10 stores computer programs for the operation of baby bedside mobile controller 8 and also various data relating to the control of baby bedside mobile 2. Baby bedside mobile 2 includes a set of mobile elements 12 which is supported by rail of the baby bed to be hanged over the head of a baby in bed. Baby bedside mobile 2 is arranged to rotate the set of mobile elements 12 and to operate music box in conjugation with the rotation of the set of mobile elements 12.

Operation portion 14 is provided to be manually operated for various purposes such as turning on and off baby bedside mobile 2, adjusting the volume of music box, selecting music, receiving music data and sampling sound, the detail of the music selection being to be explained late in more detail. If baby bedside mobile 2 is turned on by means of operating portion 14, baby bedside mobile controller 8 have the set of mobile elements 12 start to rotate, and music box signal generator 16 start to generate a predetermined music box signal, which is transmitted to amplifier 18 to cause music sound from speaker 20.

Upon generation of music box signal, every timing of the generated tones of note in the music are modified one by one to slightly fluctuate in accordance with 1/f fluctuation data sequentially outputted from 1/f fluctuation data memory 22. The starting point of the sequence of 1/f fluctuation data is differently determined every time at random in accordance with random table outputted from random table memory 24. Thus, the artificiality of electronically generated music or painful repetition of the patterned same short music is eased to provide a baby with a pleasant musical environment. The arrangement for achieving the modification according to 1/f fluctuation will be explained later in more detail.

A plurality of pieces of music data are stored in music data memory 26, baby bedside mobile controller 8 reading out the pieces one by one in a random order determined by random table memory 24 and transmitting the music data of the read piece to music box signal generator 16. Thus, painful circulation of a limited number of short pieces of music in the patterned and remembered same order is eased. The random number is outputted from random table memory 24 by means of specifying addresses of random table memory 24 one by one in a predetermined sequential order. Since the random numbers are assigned to the addresses, respectively, according to a random table, the output of random table memory 24 gotten in the above manner comes to random table. The series of numbers are indeed to be repeated in the same order if the specified address is back where it started, which means that the output of random table memory 24 is not a true random table with the repetition taken into consideration. However, the size of the random table is sufficiently so large that a human being cannot remember the order of the numbers to recognize the pattern of repetition, which means that the output of random table memory 24 is substantially a random number for a human being. The arrangement for changing the order of pieces according to the random table will be explained later in more detail.

The data of a piece of music provided to music box signal generator 16 includes information of tune and timing for generating each tone in the music. Four tones of notes of the music are able to be simultaneously generated in maximum, as a chord for example, form music box signal generator 16 in accordance with the data transmitted from baby bedside mobile controller 8. As will be explained later, the tone generated from music box signal generator 16 is of an attenuating nature, such as sound of a chime, a piano and a picked string instrument. Therefore, the data of the piece of music provided to music box signal generator 16 does not include information of length of each tone in the music. Further, since a tone once generated is not muted in the course of the attenuation, the tail of the former tone may naturally overlap the head of a new tone which is successively generated with short interval.

However, upon generation of the tone of the attenuating nature from music box signal generator 16, the attenuation of each tone is modified one by one to fluctuate in accordance with 1/f fluctuation data sequentially outputted from 1/f fluctuation data memory 22. Thus, the degree and manner of attenuation of each tone slightly changes one by one. The data of a piece of music provided to music box signal generator 16 does not include any detailed information of expression of the music, such as tempo rubato or ritardando, but includes mere mechanical information of tune and timing for generating each tone or event in the music, which reduce the capacity or amount of data. By way of compensation, music box signal generator 16 automatically carries out detailed expression of the music, such as tempo rubato or ritardando, by means of adding a series of automatic delay in response to simple information of timing to start the tempo rubato or ritardando, which is included in the data of a piece of music provided to music box signal generator 16. The automatic delay is also modified one by one to fluctuate in accordance with 1/f fluctuation data sequentially outputted from 1/f fluctuation data memory 22 to avoid a crude expression caused by stereotype tempo rubato or ritardando. The volume of music generated by music box signal generator 16 is further modified to fluctuate in accordance with 1/f fluctuation data sequentially outputted from 1/f fluctuation data memory 22. The various modifications by means of 1/f fluctuation data will be explained later in more detail.

The plurality of pieces of music stored in music data memory 26 can be substituted within the capacity of memory. The introduction of new piece data from an outside source is possible by means of baby bedside mobile short-range communicator 28. For example, cellar phone 4 is capable of downloading a new piece of music from music data server 6 through internet 30, the downloaded new piece data being then transmitted to baby bedside mobile 2 for storage in music data memory 26.

An addition of new piece of music to music data memory 26 is also possible by means of sampling hum or the like through sampler with microphone 32. In more detail, the sound data gotten by sampler 34 is introduced into pitch/timing extractor and automatic arranger 36, in which pitch and timing of start or change in tone consisting the hum or the like is extracted. Upon the extraction, a tone with a pitch out of a standard chromatic scale or timing out of a standard beat automatically corrected into the closest note on the standard chromatic scale and the standard beat in unit of a halftone and a sixteenth note. In the case that pitch and/or timing of tones are continuously unstable in a considerable degree, it is judged that the hum or the like is not sung in accordance with the intention of the singer. In this case, accordingly, a group of tones of questionable melody line or beat or meter is automatically corrected in unit of the group. If the series of tones of the extracted pitch/timing with correction made if necessary is a monophony, pitch/timing extractor and automatic arranger 36 automatically analyses chords suitable to the monophony to add a predetermined simple accompaniment thereto. The above automatic correction of tone or a group of tones and automatic addition of the accompaniment is referred to as "automatic arrangement".

Cellar phone controller 38 having a micro computer is for functioning in accordance with computer program stored in memory 42 to originally and mainly control the entire cellar phone 4 by means of phone function block 40. Operation portion 44 and display 46 are also originally and mainly arranged for the functions of cellar phone 4 carried out by phone function block 40. Operation portion 44 is, however, advantageously utilized for operating cellar phone 4 to download the music data and to transmit the downloaded music data to baby bedside mobile 2 by means of cellular phone short-range communicator 45. Also, display 46 is advantageously utilized for displaying necessary information in conjugation with the operation at operating portion 44. Cellular phone short-range communicator 45 and baby bedside mobile short-range communicator 28 are based on the infrared light communication system or short-range radio transmission system. Thus, cellar phone 4 is incorporated into the electronic music box system.

As has been apparent from the above explanation, phone function block 40 of cellar phone 4 is capable of communicating with music server 6 by way of internet 30. Music server 6 including server controller 48, music database 50 and input/output interface 52 serves as a portal site capable of providing various free information under management of a collaborated baby goods industry. The portal site may also be in cooperation with a public healthcare and medial organization for mother-child health administration. If a suitable registration is made in music data server 6 with an identification number (ID) and a password, the music data can be delivered from music data server in accordance with terms and conditions recited in a contract upon purchase of baby bedside mobile 2. Further, in the case of the above mentioned cooperation of music data server 6 with a public healthcare and medial organization, if cellar phone 4 logins with the ID and password to upload under anonymity the new growth and healthcare data for a baby, music data server 6 provides cellar phone 4 with the newest statistical growth and healthcare data created on the basis of data uploaded under the same condition from a great number of cellar phones including cellar phone 4.

Figure 2:
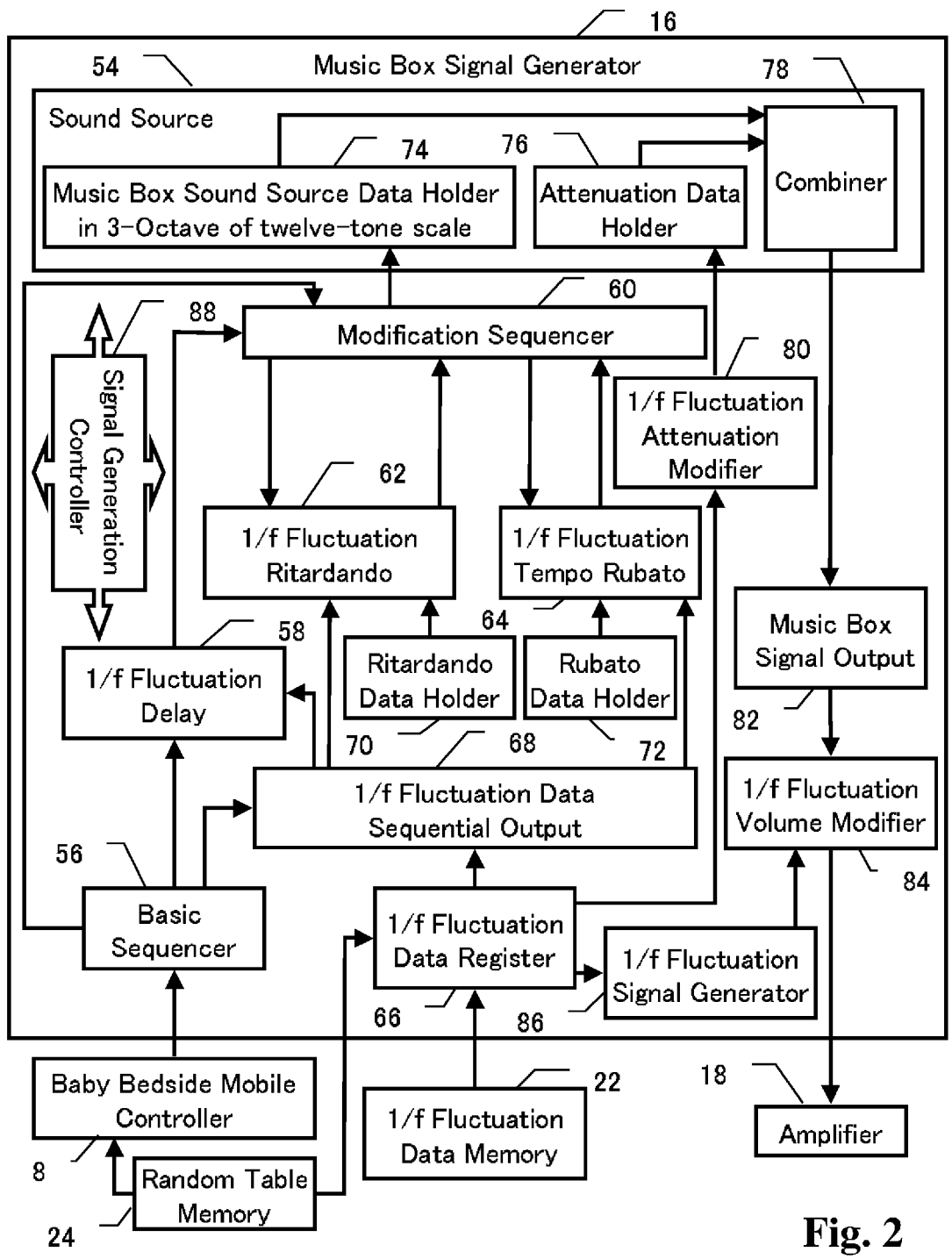
FIG. 2 is a block diagram showing the detail of music box signal generator 16 in FIG. 1.

FIG. 2 is a block diagram showing the detail of music box signal generator 16 in FIG. 1 with some relating outside blocks also shown, in which the same identification number is given to common block in FIG. 1 and FIG. 2 with explanation of the common block omitted in FIG. 2 as long as long as unnecessary. Music box signal generator 16 is basically arranged to sequentially (and simultaneously in the case of chord or polyphony) generate music box signal on the basis of sound source 54 at a suitable pitch and timing directed by a sequencer. The sequencer includes basic sequencer 56 for generating basic pitch/timing signal to specify a pitch of sound source 54 at a correct timing in accordance with a piece of music data transmitted from baby bedside mobile controller 8. The sequencer further includes 1/f fluctuation delay 58 for introducing a delay with 1/f fluctuation to the timing of the basic pitch/timing signal generated from basic sequencer 56. The sequencer still further includes modification sequencer 60 for modifying the 1/f fluctuation delayed pitch/timing signal coming from 1/f fluctuation delay 58 to add expression to the music upon necessity. The sequencer also includes 1/f fluctuation ritardando section 62 and 1/f fluctuation tempo rubato section 64 for carry out the addition of expression in cooperation with modification sequencer 60.

Upon generation of the basic pitch/timing signal by basic sequencer 56, the 1/f fluctuation data is loaded from 1/f fluctuation data memory 22 to 1/f fluctuation data register 66 prior to the start of generation of the basic pitch/timing signal by basic sequencer 56. 1/f fluctuation data sequential output 68 sequentially outputs 1/f fluctuation data by means of sequentially addressing 1/f fluctuation data register 66 in synchronism with the basic pitch/timing signal from basic sequencer 56. In the above function, the first address of 1/f fluctuation data memory 22 to be specified by 1/f fluctuation data sequential output 68 is determined by the random number given by random table memory 24. If the sequential addressing reaches the last address, the addressing returns to the first address to go in cycles, 1/f fluctuation data sequential output 68 thus continuing to output 1/f fluctuation data as long as the basic pitch/timing signal comes from basic sequencer 56. The data outputted from 1/f fluctuation data sequential output 68 in the manner described above may not be a true 1/f fluctuation data since it has the cyclic regularity. However, 1/f fluctuation data sequential output 68 can be considered to substantially outputs 1/f fluctuation data because the size of data outputted in series during one cycle is so large that a human being can never remember the order of the fluctuation or perceive its regularity. Further, by means of changing the starting point of the sequence of 1/f fluctuation data every time in accordance with random table, the pattern of 1/f fluctuation at the beginning portion of the sequence of 1/f fluctuation data, which would attract the attention and otherwise repeatedly started from the same point, is avoided to be learned.

1/f fluctuation delay 58 introduces 1/f fluctuation into the timing of the basic pitch/timing signal generated from basic sequencer 56 in accordance with the data form 1/f fluctuation data sequential output 68. In other words, the basic pitch/timing signal passes through 1/f fluctuation delay 58 with its timing differently delayed depending on the 1/f fluctuation data coming from 1/f fluctuation data sequential output 68 when the basic pitch/timing signal arrives at 1/f fluctuation delay 58. The pitch/timing signal thus delayed is transmitted from 1/f fluctuation delay 58 to modification sequencer 60. Modification sequencer 60 is normally directs pitch and timing of music box signal to be generated by sound source 54 in accordance with the delayed pitch/timing signal transmitted from 1/f fluctuation delay 58 unless no direction comes from 1/f fluctuation ritardando section 62 and 1/f fluctuation tempo rubato section 64.

On the other hand, if the data of a piece transmitted from baby bedside mobile controller 8 includes data for starting retardando at the ending portion of the piece, basic sequencer 56 sends basic pitch/timing signal succeeding the timing of the starting point for retardando to 1/f fluctuation ritardando section 62, in which a gradually growing delays according to data in retardando data holder 70 are successively introduced to the pitch/timing signal transmitted from modification sequencer 60 for adding ending expression. During the retardando, 1/f fluctuation ritardando section 62 further introduces 1/f fluctuation into the retradando timing of the pitch/timing signal in accordance with the data form 1/f fluctuation data sequential output 68. The pitch/timing signal with the retardando and 1/f fluctuation introduced is sequentially retuned to modification sequencer 60 to direct pitch and timing of music box signal to be generated by sound source 54. In the case of retardando above, 1/f fluctuation ritardando section 62 continued to introduce the retardando delay till the end of the piece.

On the contrary, if the data of a piece transmitted from baby bedside mobile controller 8 includes data for starting and ending tempo rubato in midstream of the piece, basic sequencer 56 sends basic pitch/timing signal succeeding the timing of the starting point for tempo rubato to 1/f fluctuation tempo rubato section 64, in which forward or backward deviations from in-tempo timings according to data in rubato data holder 72 are successively introduced one by one to the pitch/timing signal transmitted from modification sequencer 60 for adding tempo rubato expression to the piece. During the tempo rubato, 1/f fluctuation tempo rubato section 64 further introduces 1/f fluctuation into the deviated timing of the pitch/timing signal in accordance with the data form 1/f fluctuation data sequential output 68. The pitch/timing signal with the tempo rubato and 1/f fluctuation introduced is sequentially retuned to modification sequencer 60 to direct pitch and timing of music box signal to be generated by sound source 54. In the case of tempo rubato above, modification sequencer 60 returns from the control with 1/f fluctuation tempo rubato section 64 to the normal control at the end of the tempo rubato according to the data from rubato data holder 72.

Sound source 54 includes music box sound source data holder 74 keeping music box sound source data in 3-octave of twelve-tone scale and attenuation data holder 76 keeping attenuation data to realize music box sound of an attenuating nature, such as sound of a chime, a piano and a picked string instrument. In response to the direction by modification sequencer 60, music box sound source data holder 74 outputs music box sound source data of the specified pitch at the specified timing in accordance with a piece of music. The attenuation data kept by attenuation data holder 76 includes transition data representing attenuation of hammered sound or picked string sound to its vanish, which is combined with the music box sound source data in combiner 78 to be outputted as an attenuating music box sound of the specified pitch at the specified timing. During the attenuation, 1/f fluctuation attenuation modifier 80 further modifies the data in attenuation data holder 76 to introduce 1/f fluctuation into the attenuation in accordance with the data form 1/f fluctuation data register 66. Thus, the attenuating music box sound from combiner 78 is accompanied by 1/f fluctuation. In other words, 1/f fluctuation attenuation modifier 80 mainly influences both on the change in volume of the hammered or picked string sound and speed of the attenuation thereof to avoid uniformity of the hammered or picked string sound and its attenuation.

The output form combiner 78 is converted into sound signal by music box signal output 82, which is in turn to be transmitted to 1/f fluctuation volume modifier 84 to introduce 1/f fluctuation into the volume of the sound signal. In more detail, 1/f fluctuation volume modifier 84 adds 1/f fluctuating change in the volume to the sound signal from music box signal output 82 by means of 1/f fluctuation signal generator 86 which generates time varying signal with 1/f fluctuation in accordance with the data form 1/f fluctuation data register 66. The 1/f fluctuating change in the volume serves as the musical vibrato of the music box sound. Signal generation controller 88 controls the above mentioned various functions and their cooperation in music box signal generator 16.

Figure 3:
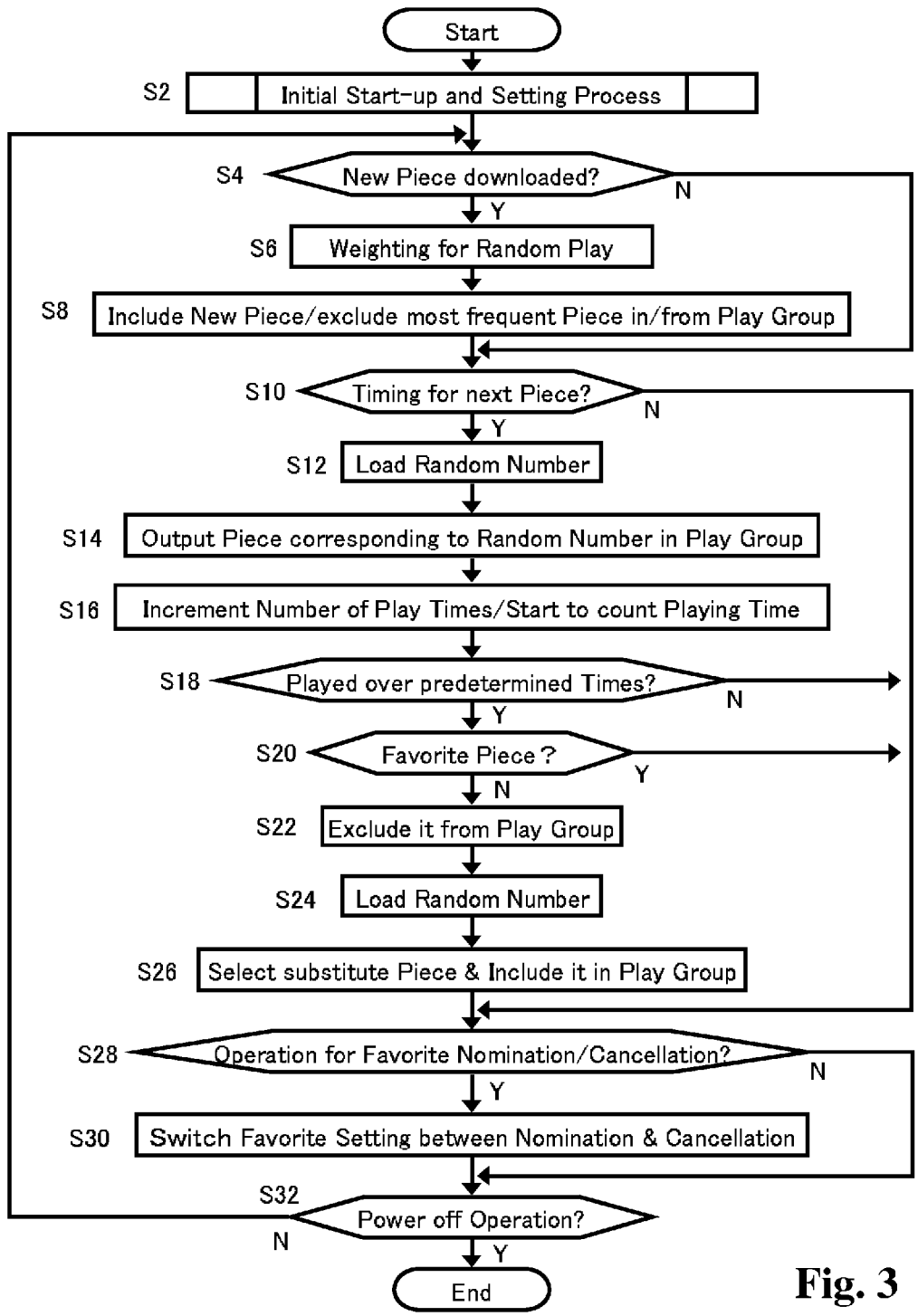
FIG. 3 is a basic flowchart showing the function carried out by baby bedside mobile controller 8 of the embodiment in FIGS. 1 and 2.

FIG. 3 is a basic flowchart showing the function carried out by baby bedside mobile controller 8 of the embodiment in FIGS. 1 and 2, the flow being arranged to start in response to the power on operation or setting operation at operating portion 14, the setting operation including the new music piece downloading operation as will be explained later. If the flow starts, step S2 comes first to carry out the initial start-up and setting process of baby bedside mobile 2. If the initial start-up and setting process is over and no further setting operation is done for a predetermined time, e.g., 3 seconds, the flow automatically advances to step S4. Thus, the power on operation is followed by a predetermined waiting time for allowing a setting operation since there is a high possibility of setting operation upon the power on operation. However, the flow automatically advances to step S4 in the predetermined time if there is no further operation, which makes it possible for a user who does not know any manner of operation at all to start the function of baby bedside mobile 2 accompanied by the play of music box by means of a mere power on operation. Step 2 can be reached any time desired to restart the flow of FIG. 3 by means of a setting operation even in the course of playing of music box. Step S2 will be explained later in more detail.

In step S4, it is checked whether or not a new piece has been downloaded. If the download is confirmed in step S4, the flow goes to step S6 to wait the new piece for random play. This is for increasing the frequency for the newly downloaded piece to be played under random selection, the detail of which will be explained later. In next step S8, the newly downloaded piece is included into the play group in substitution for the most frequently played piece which is to be excluded from the play group, in which the favorite nominated piece is excepted from the exclusion even if the frequency of play is high, the flow then going to step S10. The above mentioned "play group" means a group of pieces consisting of a predetermined number, e.g. five pieces, nominated for play in sequence. As will be explained later in more detail, one of the pieces in the play group is sequentially selected one by one at random. The newly nominated piece into the play group is so waited as to be selected in higher probability under the random selection. On the other hand, if it is determined in step S4 that no new piece has been downloaded, the flow directly goes to step S10.

In step S10, it is checked whether or not the timing for starting to play the next piece in the play group has come. As will be explained later, time count is started after loading the music data for the former piece to know whether or not the playing time for the piece has over. Step S10 is to check whether a blank intermission time, e.g. 2.5 seconds, has past after the playing time for the former piece was over. If it is determined in step S10 that the timing for starting the next piece has come, the flow goes to step S12 to load a random number from random table memory at an address in accordance with the order for play. And, in step S14, a piece corresponding to the loaded random number in the play group is outputted to music box signal generator 16. Further, in step S16, the number of times for play of the piece is incremented, and the counting of the playing time for the piece is started, the flow then going to step S18.

In step S18, it is checked whether or not the number of times for play of the piece reaches a predetermined number, e.g., two hundreds. If the predetermined number has been reached, the flow goes from step S18 to step S20 to check whether or not the piece is nominated as a favorite. If not, the flow goes to step S22 to exclude the piece, the number of times for play of which reaches a predetermined number, from the play group. Next in step S24, step S12 a random number is loaded from random table memory at an address in accordance with the order for substitution. And, in step S26, a piece corresponding to the loaded random number is selected from pieces off the play group in music data memory 26 as a substitution. Further in step 26, the selected piece is included into the play group, the flow then going to step S28. On the other hand, if it is not determined in step S18 that the number of times for play of the piece reaches a predetermined number, or if it is determined in step S20 that the piece is nominated as a favorite, the flow directly goes to step S28. Further, if it is not determined in step S20 that the timing for starting the next piece has come, the flow also goes to step S28 directly.

In step S28, it is checked whether or not an operation for favorite nomination or cancellation thereof is made. If such an operation is detected in step SS28, the flow goes to step S30 to switch favorite setting between nomination and cancellation as to a specific piece which is being played at that time or has ended to be played with the next piece not started yet, the flow then going to step S32. On the other hand, if it is not determined in step S28 that any operation for favorite nomination or cancellation thereof is made, the flow directly goes to step S32. In step S32, it is checked whether or not the power off operation is made. If not, the flow goes back to step S4 to repeat the loop of step S4 to step S32 to cope with the play of the next piece in the play group, or the inclusion of a new piece into the play group, or substitution of a piece in the play group, or the like. On the other hand, if it is determined in step S32 that the power off operation is made, the flow goes to the end, which stops the play of music box.

Figure 4:
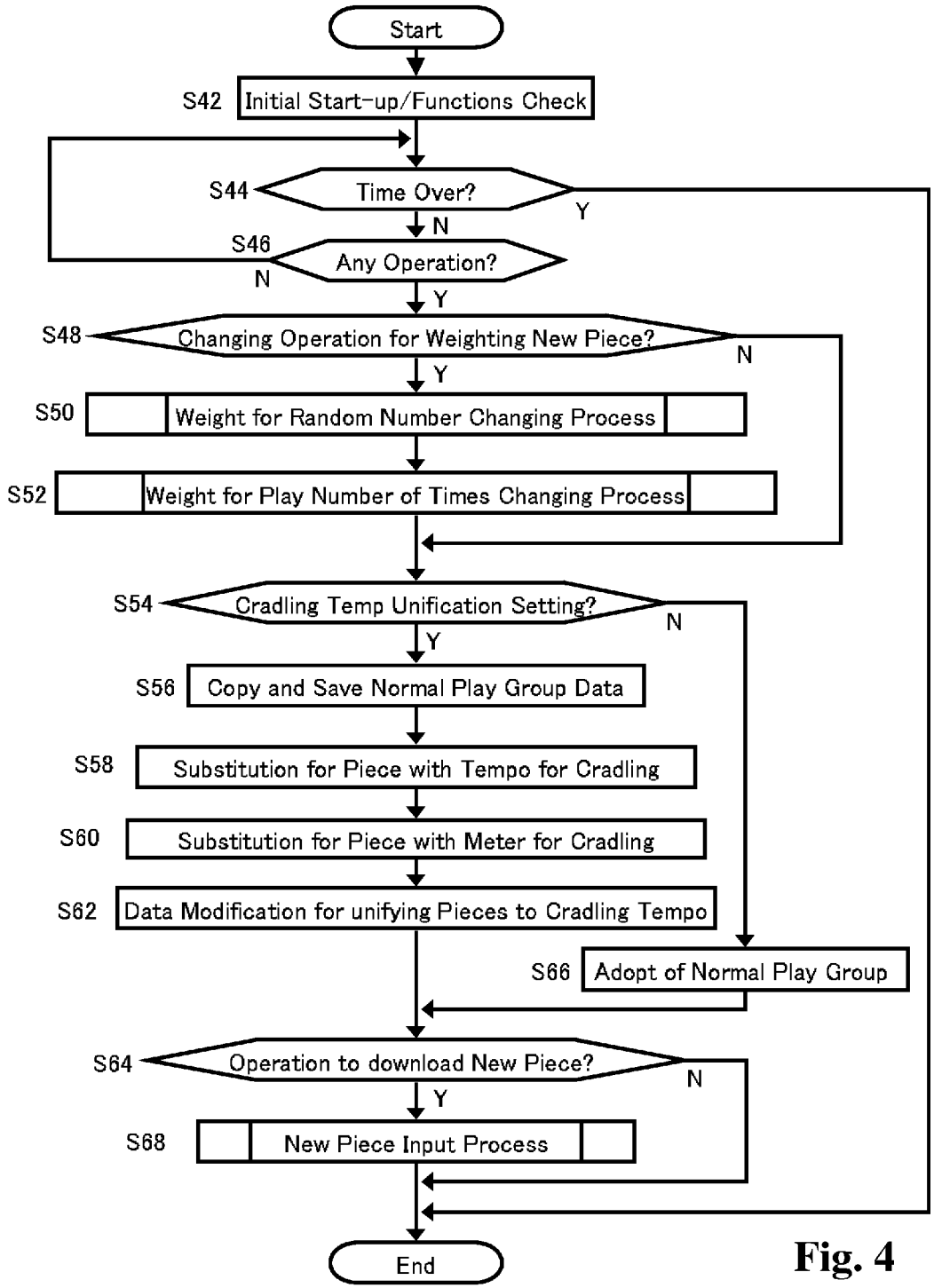
FIG. 4 is a flowchart showing the detailed function of the initial start-up and setting process of step S2 in FIG. 3.

FIG. 4 is a flowchart showing the detailed function of the initial start-up and setting process of step S2 in FIG. 3. If the flow starts, step S42 comes first to carry out the initial start-up and initial check of various functions of baby bedside mobile 2, the flow then going to step S44. In step S44, it is checked whether or not the predetermined time period, e.g., 3 seconds as mentioned above, succeeding the completion of step S42 has been over. If not the flow goes back to step S46 to check whether or not any operation other than power on operation is made. If no operation is detected in step S46, the flow goes back to step S44 to repeat steps S44 and S46 to wait for the predetermined time period.

If any operation within the predetermined time period is detected in step S46, the flow goes to step S48 to check whether or not the operation is a changing operation for the weight to be added to the newly downloaded piece. If the setting operation is detected in step S48, the flow goes to step S50 to carry out weight changing process for changing the weight for random number assigned to the new piece. Here, relationships among the random number, a piece to which the random number is assigned, and the weighting of the piece are explained. In a case that a play group consists of evenly weighted five pieces and random numbers of two-digit are prepared for example, twenty numbers of 00 to 19 are assigned to the first piece. In the similar manner, the numbers of 20 to 39 are assigned to the second piece, the numbers of 40 to 59 to the third piece, the numbers of 60 to 79 to the fourth piece, and the numbers of 80 to 99 to the fifth piece, respectively. And one of random numbers 00 to 99 is loaded one by one to select a piece one by one to which the number equal to the loaded random number is assigned. On the contrary, if the new piece is triply weighted for example, forty three numbers of 00 to 42 are assigned to the new piece. In contrast thereto, the fourteen numbers of 43 to 56 are assigned to the old first piece, the fourteen numbers of 57 to 70 to the old second piece, the fourteen numbers of 71 to 84 to the old third piece, and the fifteen numbers of 85 to 99 to the old fourth piece, respectively. Thus, the numbers assigned to the new piece are about three times as many as those assigned to the old pieces so that the new piece is selected with triple probability of that of the old pieces in response to the load of random figure. The assignment of the numbers to each piece is changed to shift piece to piece every time when the substitution of a piece for the play group is carried out to avoid such a case that the same numbers are continued to be assigned to the same piece. The weight for random number changing process in step S50 is to optionally change in advance the weight to be added to the new piece, for example, double to triple, or quadruple to even, or the like, the changing operation in advance being possible at operation portion 44.

Further in step S52, weight for play number of times changing process is carried out. For example, in the case that the threshold of play number of times to remove a piece from the play group for substitution is three hundred, the threshold for the new piece would be nine hundred if the new piece is triply weight as to the play number of times. By means of such a weighting, the new piece will not be removed from the play group for substitution until it will have been played triple number of times in comparison with the old pieces. Thus, the opportunities for new piece to be played are is increased with the removal reprieved. The weight for play number of times changing process in step S52 is to optionally change in advance the weight to be added to the new piece, the changing operation in advance for step S52 being also possible at operation portion 44. If the changing processes in steps S50 and S52 are completed, the flow goes to step S54. On the other hand, if it is not determined in step S48 that the operation is a changing operation for the weight to be added to the newly downloaded piece, the flow directly goes to step S54.

In step S54, it is checked whether or not an operation for the cradling tempo unification setting is made. According to the embodiment, pieces in the play group are played in sequence determined by the random number, in which there is no limitation to the selection of pieces to be included in the play group for avoiding an excessive monotony. Accordingly, there may ordinary be a case that a waltz piece follows a quadruple tune in Andante. Further, a piece of music box is arranged into a short composition less than one minute. This means that baby bedside mobile 2 normally plays music box pieces in sequence in such a manner that the tempo and meter vary piece to piece in a short period less than one minute. However, in a special case that a mother is sending a baby to sleep in her arms with the baby cradled in synchronism with the music box pieces, the series of pieces are desired to be played in the same tempo for a considerably sufficient time period rather than a case that the tempo or meter of the series of pieces vary in every short period such as one minute or less. The cradling tempo unification setting, the setting or not of which is checked in step S54 is to be done when the tempo unification is desired is the special case above for example.

If the cradling tempo unification setting is detected in step SS54, the flow goes to step S56 to copy and save the normal play group data at the time when the setting is made. Next in step S58, any piece which is inadequate to be played in the cradling unification tempo is excluded from the play group to be replaced by another adequate piece of an inherent tempo resembling those of other pieces in the play group. For example, if the majority of pieces are of Andante, an Allegretto piece is replaced by another Andante piece because the inherent Allegretto piece would become spiritless if played in Andante due to the unification. Further in step S60, any piece of an inadequate meter for the unification is excluded from the play group to be replaced by another adequate meter. For example, if the majority of pieces are of slow waltz rhythm, a piece of slow compound double meter (6/8 beat) is inadequate to unify it to slow waltz rhythm. In other words, if one beat of the double meter is adjusted to synchronism with one beat of the slow waltz, the inherent meter would be confused. Or, if 1/8 beat is adjusted to synchronism with one beat of the slow waltz, an oddly slow compound double meter piece would result. In such a case, the compound double meter piece is excluded from the play group to be replaced by another adequate slow waltz piece in step S60. And, in step S62, data modification of the pieces of the resembling tempo and meter in the play group as the result of the substitution in step S58 and step S60 is carried out to finally unify the tempo of the pieces existing in the play group into the tempo of cradling, the flow then going to step S64. Thus, under the cradling tempo unification setting, the series of pieces in the modified play group are played in the same tempo for a considerably sufficient time period.

On the other hand, if is it is not determined in step S54 that the operation for cradling tempo unification setting is made, the flow advances to step S66 to adopt the normal play group to go to step S64. In the case that the normal play group has been formally copied and saved, the saved normal play group is retrieved to replace the cradling tempo unified play group as the function of step S66 in response to step S54 functioning to detect that the former cradling tempo unification setting is cancelled.

In step S64, it is checked whether or not the operation detected in step 46 corresponds to an operation for downloading new piece is made. In the case that the new piece downloading operation is detected, the flow goes from step S64 to step S68 to carry out new piece input process, the flow going to the end in response to the completion of the new piece input process in step S68. The termination of the flow of FIG. 4 means the advance of flow from step S2 to S4 in FIG. 3 for carrying out the play of music box. On the other hand, if the operation to download new piece is not determined in step S64, the flow instantly goes to the end. Further if it is determined in step S44 that the predetermined time period has been over, the flow instantly goes to the end. The flow of FIG. 4 may so modified that the flow goes back to step S44 from steps S64 and S68 and that the flow only goes to the end by way of step S44 when the predetermined time period counted from the completion of the last function caused by the operation other than power on operation is over.

In the flowchart in FIG. 4, cradling tempo unification function about a plurality of pieces is explained in steps S56 to S62. However, the embodiment is not limited to the flowchart, but various modification of the cradle mode function is possible. According to the most simplified modification, for example, the most adequate temperate piece for cradling is to be selected among the existing play group in response to the cradling setting detected in step S54. And, the selected piece is to be simply repeated.

Figure 5:
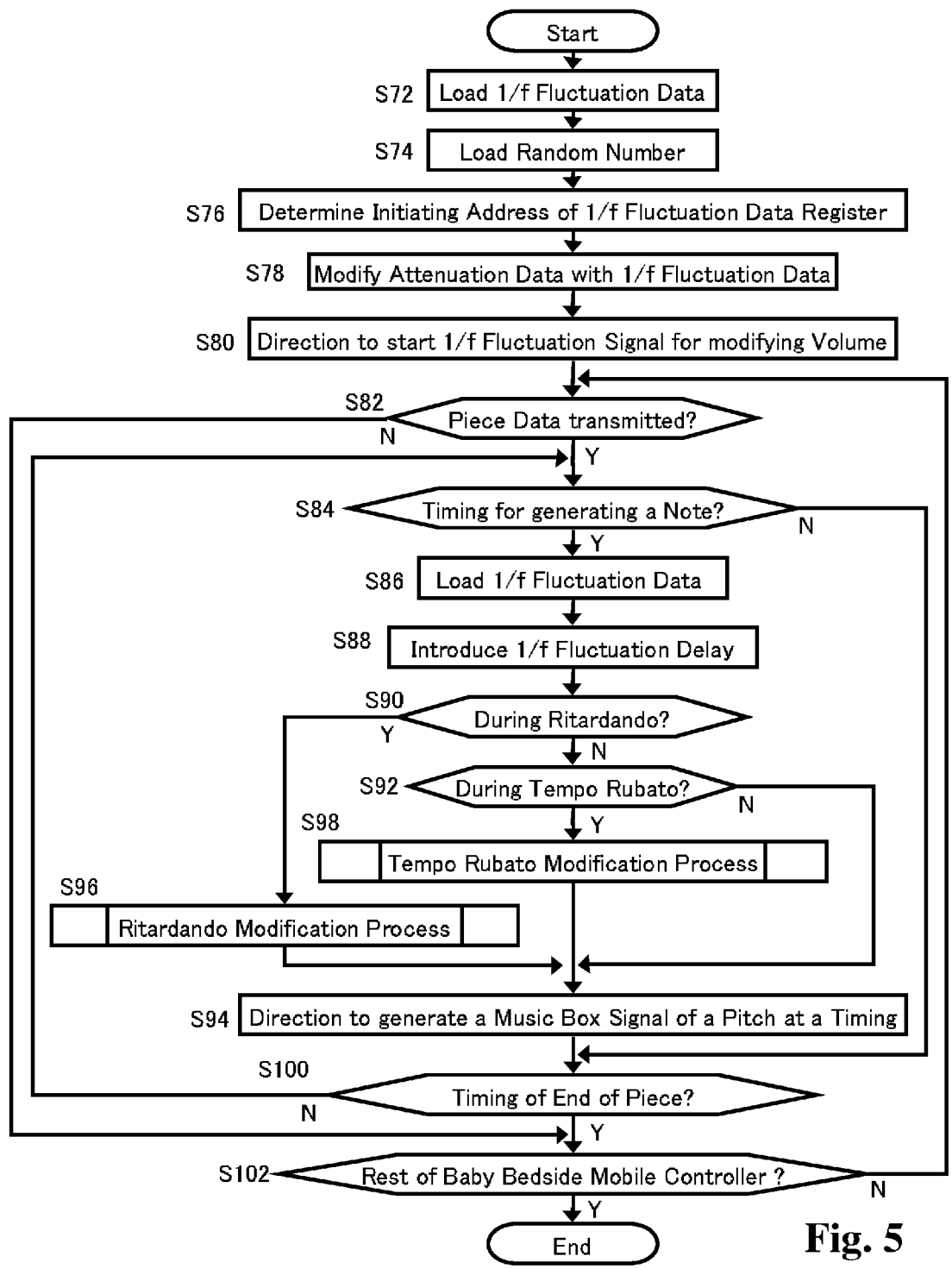
FIG. 5 is a flowchart showing the function carried out by signal generation controller 88 in music box signal generator 16 in FIG. 2

FIG. 5 is a flowchart showing the function carried out by signal generation controller 88 in music box signal generator 16 in FIG. 2, the flow being arranged to start in response to start of function of baby bedside mobile controller 8. If the flow starts, step S72 comes first to load 1/f fluctuation data from 1/f fluctuation data memory 22 to 1/f fluctuation data register 66. Next, in step S74, a random number form random table memory 24 to advance to step S76 for determining the initiating address of 1/f fluctuation data register 66 in accordance with the loaded random number.

Further in step S78, 1/f fluctuation is introduced into the attenuation of each music box sound by 1/f fluctuation attenuation modifier 80 which modifies the data in attenuation data holder 76 in accordance with the data form 1/f fluctuation data register 66. And, in step S80, 1/f fluctuation signal generator 86 is directed to starts generation of time varying signal with 1/f fluctuation in accordance with the data form 1/f fluctuation data register 66 to introduce 1/f fluctuation into the volume of the sound signal passing through 1/f fluctuation volume modifier 84, the flow then going to step S82.

In step S82, it is checked whether or not the data of a piece is transmitted from baby bedside mobile controller 8 to basic sequencer 56. If it is determined in step S82 that the data of piece is transmitted, the flow goes to step S84 to check whether or not timing for generating a tone of note in the music comes in accordance with pitch/timing signal from basic sequencer 56. If it is determined in step S84 that the timing comes, the flow goes to step S86 to load one data from 1/f fluctuation data sequential output 68 in synchronism with the timing of generating tone, the flow then going to step S88. In step S88, 1/f fluctuation delay 58 introduces 1/f fluctuation delay into the timing of the basic pitch/timing signal generated from basic sequencer 56 in accordance with the loaded data form 1/f fluctuation data sequential output 68, the flow then going to step S90.

In step S90, it is checked whether or not the music is during ritardando. Here, it should be noted that "during ditardando" means to include a moment that the information of timing to start the ritardando is just detected. If it is not determined in step S90 that the music is during ritardando, the flow goes to step S92 to check whether or not the music is during tempo rubato. Thus, if the music is not during ritardnado nor tempo rubato, the flow directly goes to step S94. The determination whether or not the music is during ritadando or tempo rubato is possible by checking whether or not the basic pitch/timing signal coming to modification sequencer 60 includes a timing signal indicative of the start of ritadando or tempo rubato or by checking whether or not a specific flag explained later is made on by the start of ritadando or tempo rubato. In step S94, a direction from modification sequencer 60 is made to have music box sound source data holder generate a music box signal of a pitch and timing in response to the pitch/timing signal originated from basic sequencer and 1/f fluctuation delayed through step S88, the flow then going to step S100. On the other hand, if it is determined in step S90 that the music is during ritardando, the flow goes to step S96 to carry out ritadando modification process, in which the pitch/timing signal modified in step S88 to include 1/f fluctuation delay is further modified to include ritardando delay, the flow then going to step S94. On the contrary, if it is determined in step S92 that the music is during tempo rubato, the flow goes to step S98 to carry out tempo rubato modification process, in which the pitch/timing signal modified in step S88 to include 1/f fluctuation delay is further modified to include tempo rubato expression, the flow then going to step S94. The ritardando modification process in step S96 and the tempo rubato modification process in step S98 will be explained later in more detail, respectively.

In step S100, it is checked whether or not the music box signal of a pitch and timing directed in step S94 is for the timing of the end of piece. If not the flow goes back to step S84. On the other hand, if it is not determined in step S84 that timing for generating a tone of note in the music comes in accordance with pitch/timing signal from basic sequencer 56, the flow directly goes to step S100. Also in this case, the flow goes back to step S84. Thus, unless the end of piece is detected in step S100, the flow repeats the loop of steps S84 to S100 to wait for next timing for generating a tone of note in the music. And, if the next timing comes, the flow basically carries out steps S86 to S92 and also step S96 or step S98 where necessary to reach step S94 for carrying out the direction to have music box sound source data holder 74 generate one tone (or a group of simultaneous tones in the case of chord or polyphony).

On the other hand, if it is determined in step S100 that the music box signal of a pitch and timing directed in step S94 is for the timing of the end of piece, the flow goes to step S102 to check whether or not baby bedside mobile controller 2 is made into rest state. If not, but baby bedside mobile controller 2 is in operation, the flow goes back to step S82. On the other hand, if it is not determined in step S82 that the data of a piece is transmitted from baby bedside mobile controller 8 to basic sequencer 56, the flow directly goes to step S102. Thus, unless baby bedside mobile controller 2 is made into rest state, the loop of steps S82 to S102 is repeated for continuing to play music box pieces one by one. By the way, if it is determined in step S100 that the music box signal of a pitch and timing directed in step S94 is for the timing of the end of piece, the data of piece the play of which has been completed is deleted with the flag indicative of during ritardando or tempo rubato put down if any.

Figure 6:
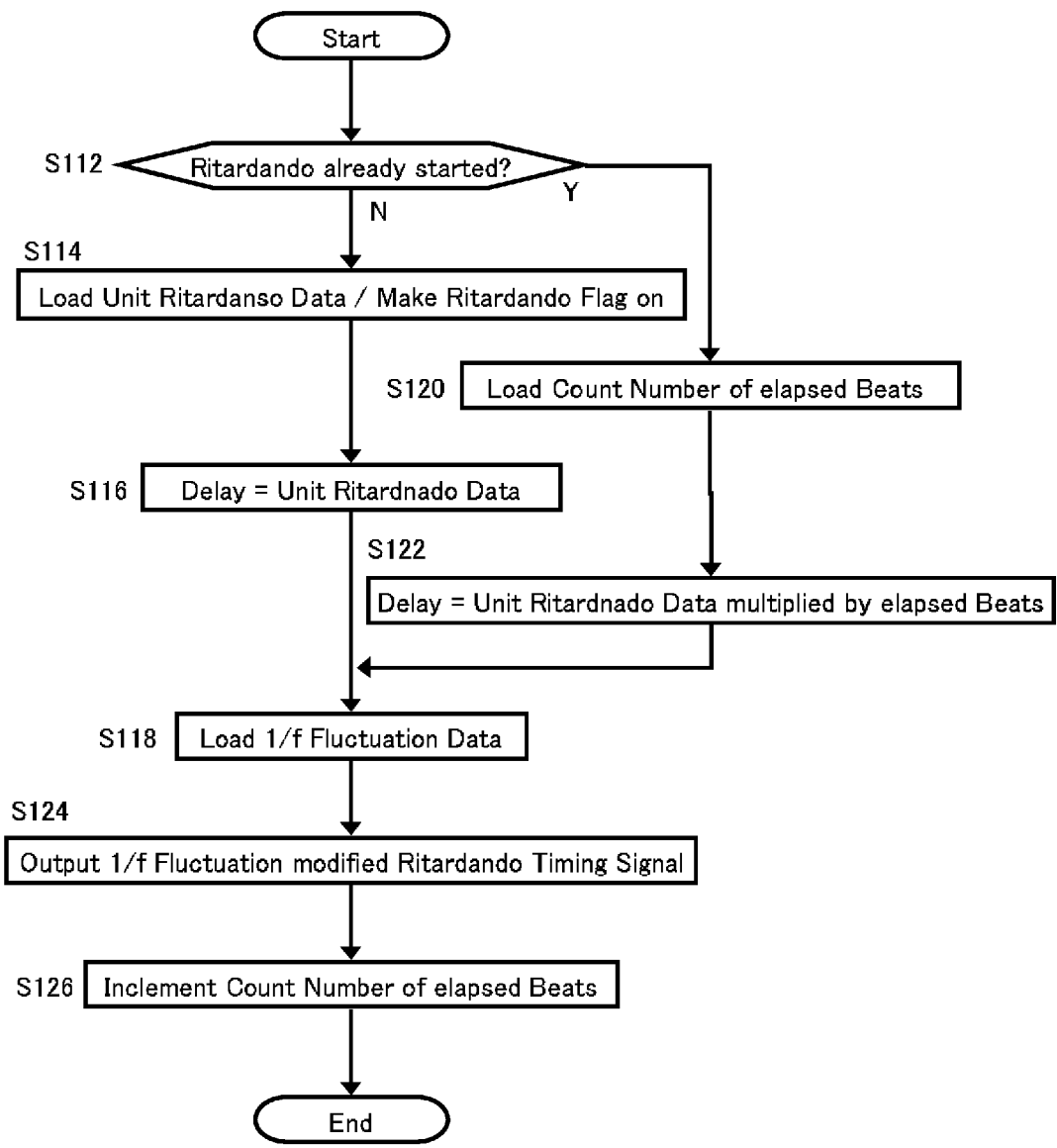
FIG. 6 is a flowchart showing the detailed function of the ritardando modification process of step S96 in FIG. 5.

FIG. 6 is a flowchart showing the detailed function of the ritardando modification process of step S96 in FIG. 5. If the flow starts, step S112 comes first to check whether or not ritardando has been already started. If not, the flow gees to step S114 to load a unit ritradando data and to make the ritardando flag on since step S114 is caused by the case that the flow in FIG. 5 comes from step S90 to step S96 in response to the detection of the information of timing to start the ritardando which is just detected. Next in step S116, the initial delay is set at an interval corresponding to the unit ritardando data. And, in step S118, one of 1/f fluctuation data is loaded from 1/f fluctuation data sequential output 68 to modify the delay to introduce 1/f fluctuation. On the basis of the function by the above steps, ritardando timing signal modified with 1/f fluctuation is outputted in step S124. Further in step S126, the number elapsed beats counted from the initiation of ritardando is incremented, the flow then going to the end. In accordance with the ritardando timing signal modified with 1/f fluctuation outputted in step S124, the direction is made in step S94 in FIG. 5 to have music box sound source data holder generate the music box signal of a pitch and timing during ritardando.

On the other hand, if it is determined in step S112 that ritardando has been already started, the flow goes to step S120 to load the number of elapsed beats counted from the initiation of ritardando since step S120 is caused by the case that the flow comes from step S90 to step S96 in response to the detection of the ritardand flag formerly made on in step S114 upon initiation of the ritardando. Next in step S122, the delay is set at an interval corresponding to the unit ritardando data multiplied by the loaded number of elapsed beats, the flow then going to step S118. In this case, a similar process to that in the case of initial delay is carried out in the steps led by step S118 except that the delay interval is different. According to the manner explained above, the flow in FIG. 6 is repeatedly carried out with the number of elapsed beats incremented to increase the delay every time when the timing for generating a note comes, the retardando being thus achieved.

Figure 7:
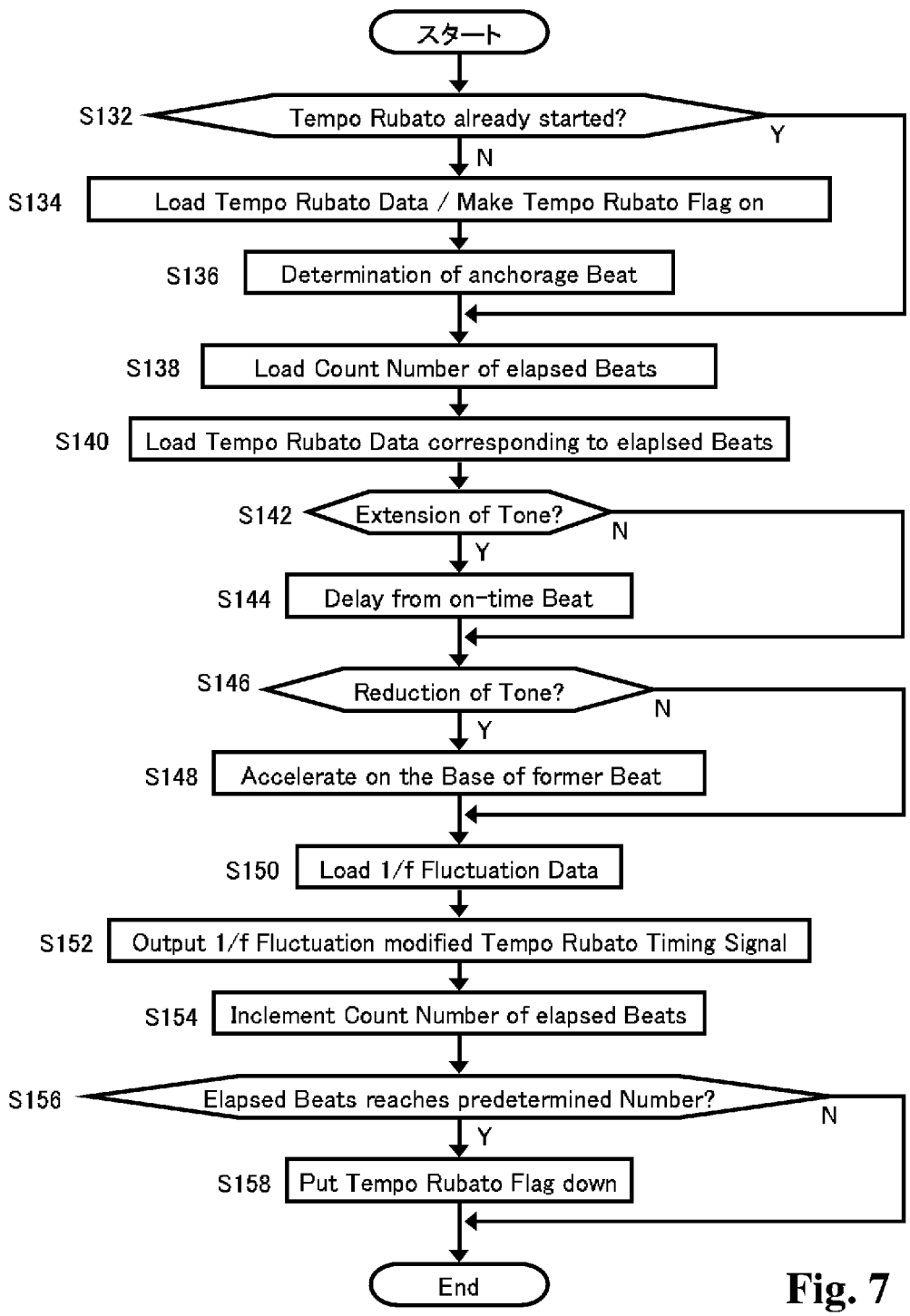
FIG. 7 is a flowchart showing the detailed function of the tempo rubato modification process of step S98 in FIG. 5.

FIG. 7 is a flowchart showing the detailed function of the tempo rubato modification process of step S98 in FIG. 5. If the flow starts, step S132 comes first to check whether or not tempo rubato has been already started. If not, the flow gees to step S134 to load tempo rubato data and to make the tempo rubato flag on since step S134 is caused by the case that the flow in FIG. 5 comes from step S92 to step S98 in response to the detection of the information of timing to start the tempo rubato which is just detected. Next in step S136, an anchorage beat for the tempo rubato is determined, the flow then going to step S138. The anchorage beat means a supporting timing point for carrying out the tempo rubato, the anchorage beat being normally set at the beat in front of the beat where the tempo rubato is started. On the other hand, if it is determined in step S132 that tempo rubato has been already started, the flow directly goes to step S138 since it is the case that the flow comes from step S92 to step S98 in response to the detection of the tempo rubato flag formerly made on in step S134 upon initiation of the tempo rubato.

In step S138, the number of elapsed beats counted from the timing of the anchorage beat is loaded. The flow then goes to step S140 to load one of the tempo rubato data corresponding to the number of the elapsed beats loaded in step S138, the flow then going to step S142. In step S142, it is checked whether or not the loaded tempo rubato data is to extend the length of tone. In the case of extension of tone, the flow goes to step S144 to delay the timing of the basic pitch/timing signal from the on-time beat, the flow then going to step S146. On the other hand, if extension of tone is not detected in step S142, the flow directly goes to step S146. In step S146, it is checked whether or not the loaded tempo rubato data is to reduce the length of tone. In the case of reduction of tone, the flow goes to step S148 to accelerate the timing of the basic pitch/timing signal on the basis of the on-time beat in front of the beat to be accelerated, the flow then going to step S150.

On the other hand, if reduction of tone is not detected in step S146, it means that the tempo rubato data is neither for extension of tone, nor for reduction of tone, but for return from the formally extended or reduced tone to the on-time beat. Therefore, the flow directly goes from step S146 to step S150 in this case. In other words, the timing of the pitch/timing signal is neither delayed nor accelerated even during tempo rubato, but the timing is basically of the pitch/timing signal which is inputted into modification sequencer 60 as it is.

In step S150, one of 1/f fluctuation data is loaded from 1/f fluctuation data sequential output 68 to modify the delay to introduce 1/f fluctuation. On the basis of the function by the above steps, tempo rubato timing signal modified with 1/f fluctuation is outputted in step S152. Further in step S154, the number elapsed beats counted from the timing of the anchorage beat is incremented, the flow then going to step S156. In step S156, it is checked whether or not the number of elapsed beats reaches a predetermined number as a result of the increment, the predetermined number corresponding to the number of the beats between the anchorage beat and the beat at which the tempo rubato is ended. Thus, if it is determined in step S156 that the number of elapsed beats reaches the predetermined number, the flow goes to step S158 to put the tempo rubato flag down, the flow then going to the end. On the other hand, if it is not determined in n step S156 that the number of elapsed beats reaches the predetermined number, the flow instantly goes to the end. According to the manner explained above, the flow in FIG. 7 is repeatedly carried out to achieve the tempo rubato at that timing one by one, the total tempo rubato being thus achieved for a given time interval The various features and advantages according to this invention are not limited to the disclosed embodiment above, but they are widely applicable to various other embodiments which are possible to enjoy one or more of the advantages of this invention. According to the embodiment explained above, for example, ritardando modification process 96 is carried out in a simplified manner as in FIG. 6, in which the ritardando delay is attained on the basis of the unit retardando data and its multiple since ritardand is a simply increasing delay at the ending portion of a piece. However, the detailed manner of achieving ritardando is not limited to the embodiment, but various modifications are possible. For example, the ritardando modification process can be realized by the detailed manner similar to that in FIG. 7, in which ritardando data for every beat is to be loaded one by one to determine the delay every time as in the case of tempo rubato.

What is claimed is:

1. An electronic device for playing electronically generated music comprising:
    a memory arranged to store music data of a piece of short music;
    a basic sequencer arranged to specify a pitch of music at a correct timing in accordance with the music data of the memory;
    a speaker;
    a music generator arranged to repeat the same piece of short music on the speaker in response to the basic sequencer, the short music being identifiable as the same piece through the repetition thereof;
    a source of fluctuation data differently determined every time at random; and
    a controller arranged to differently modify one of the pitch and timing specified by the basic sequencer in accordance with the fluctuation data every time the same piece of music is repeated to ease a pain due to otherwise mere repetition of the patterned same electronically generated music played on the speaker.

2. The electronic device according to claim 1, wherein the controller is arranged to check whether or not the music is during ritardando to modify the retardando in accordance with the fluctuation data to ease artificiality of the retardando of the music or repetition of the patterned retardando of the music.

3. The electronic device according to claim 1, wherein the controller is arranged to check whether or not the music is during tempo rubato to modify the tempo rubato in accordance with the fluctuation data to ease artificiality of the tempo rubato of the music or repetition of the patterned tempo rubato of the music.

4. The electronic device according to claim 3, wherein the tempo rubato is to extend or reduce length of a tone, and wherein the controller is arranged to return music to an on-time beat from the formally extended or reduced tone.

5. The electronic device according to claim 1, wherein the controller is arranged to modify the pitch of tone of the music in accordance with the fluctuation data to ease artificiality of electronically generated pitch or repetition of the patterned same short music.

6. The electronic device according to claim 1, wherein the controller is further arranged to modify attenuation of sound in accordance with the fluctuation data to ease artificiality of electronica attenuation or repetition of the patterned same attenuation.

7. The electronic device according to claim 6 further comprising sound source having attenuation data to realize sound of an attenuating nature, wherein the controller is arranged to modify the attenuation of sound realized by the attenuation data in accordance with the fluctuation data to ease artificiality or patterned repetition of the attenuation due to the attenuation data.

8. The electronic device according to claim 1 further comprising sound output to generate the music of a volume of sound, wherein the controller is arranged to modify the volume of the music in accordance with the fluctuation data to ease artificiality or patterned generation of the sound.

9. The electronic device according to claim 1 further comprising a random table memory arranged to store a random table, wherein the controller is arranged to use the fluctuation data based on the random table memory to avoid any pattern of fluctuation data from being learned.

10. An electronic device for playing electronically generated music comprising:
a memory arranged to store music data of a piece of short music;
a basic sequencer arranged to play music in accordance with the music data the memory;
a speaker;
a music generator arranged to repeat the same piece of short music on the speaker in response to the basic sequencer, the short music being identifiable as the same piece through the repetition thereof;
a source of fluctuation data;
a random table memory arranged to store a random table; and
a controller arranged to differently modify the music played on the speaker in accordance with the fluctuation data based on the random table every time the same piece of music is repeated to avoid any pattern of fluctuation data from being learned.

11. The electronic device according to claim 10, wherein the controller is arranged to check whether or not the music is during ritardando to modify the retardando in accordance with the fluctuation data based on the random table.

12. The electronic device according to claim 10, wherein the controller is arranged to check whether or not the music is during tempo rubato to modify the tempo rubato in accordance with the fluctuation data based on the random table.

13. The electronic device according to claim 12, wherein the tempo rubato is to extend or reduce length of a tone, and wherein the controller is arranged to return music to an on-time beat from the formally extended or reduced tone.

14. The electronic device according to claim 10, wherein the controller is arranged to modify pitch of tone of the music in accordance with the fluctuation data based on the random table.

15. The electronic device according to claim 10, wherein the controller is further arranged to modify attenuation of sound in accordance with the fluctuation data based on the random table.

16. The electronic device according to claim 15 further comprising sound source having attenuation data to realize sound of an attenuating nature, wherein the controller is arranged to modify the attenuation of sound realized by the attenuation data in accordance with the fluctuation data based on the random table.

17. The electronic device according to claim 10 further comprising sound output to generate the music of a volume of sound, wherein the controller is arranged to modify the volume of the music in accordance with the fluctuation data to ease artificiality or patterned generation of the sound.

18. An electronic device for playing electronically generated music comprising:
a memory arranged to store music data of a piece of short music;
a basic sequencer arranged to play music in accordance with the music data of the memory;
a speaker;
a music generator arranged to repeat the same piece of short music on the speaker in response to the basic sequencer, the short music being identifiable as the same piece through the repetition thereof;
a source of fluctuation data; and
a controller arranged to check a specified part of the music on the basis of the music data of the memory to differently modify the specified part of music played on the speaker in accordance with the fluctuation data every time the same piece of music is repeated.

19. The electronic device according to claim 18, wherein the controller is arranged to specify the part of the music in which the music is during ritardando to modify the retardando in accordance with the fluctuation data.

20. The electronic device according to claim 18, wherein the controller is arranged to specify the part of the music in which the music is during tempo rubato to modify the tempo rubato of the music in accordance with the fluctuation data.

* * * * *